(12) United States Patent
Jeon et al.

(10) Patent No.: US 12,483,090 B2
(45) Date of Patent: Nov. 25, 2025

(54) ELECTRIC COMPRESSOR

(71) Applicant: Hanon Systems, Daejeon (KR)

(72) Inventors: Hyo Keun Jeon, Daejeon (KR); Sae Bom Kim, Daejeon (KR); Chan Ho Baek, Daejeon (KR); Gwang Hoon Song, Daejeon (KR); Suk Jae Chung, Daejeon (KR); Kyung Ah Hong, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/724,697

(22) PCT Filed: Apr. 13, 2023

(86) PCT No.: PCT/KR2023/004991
§ 371 (c)(1),
(2) Date: Jun. 27, 2024

(87) PCT Pub. No.: WO2024/063236
PCT Pub. Date: Mar. 28, 2024

(65) Prior Publication Data
US 2025/0219502 A1     Jul. 3, 2025

(30) Foreign Application Priority Data
Sep. 21, 2022   (KR) .................. 10-2022-0119520

(51) Int. Cl.
*H02K 7/04*      (2006.01)
*H02K 1/2706*    (2022.01)
*H02K 1/32*      (2006.01)

(52) U.S. Cl.
CPC ............. *H02K 7/04* (2013.01); *H02K 1/2706* (2013.01); *H02K 1/32* (2013.01)

(58) Field of Classification Search
CPC .......... H02K 7/04; H02K 1/2706; H02K 1/32
See application file for complete search history.

(56) References Cited

U.S. PATENT DOCUMENTS

| | | | |
|---|---|---|---|
| 10,954,944 B2 * | 3/2021 | Seibel | ............... F04C 29/0085 |
| 2004/0179967 A1 * | 9/2004 | Morozumi | .......... F04C 18/0215 |
| | | | 418/101 |

(Continued)

FOREIGN PATENT DOCUMENTS

| | | | |
|---|---|---|---|
| JP | 2004336831 A | * | 11/2004 |
| JP | 2015166553 A | | 9/2015 |

(Continued)

*Primary Examiner* — Matthew T Largi
(74) *Attorney, Agent, or Firm* — Shumaker, Loop & Kendrick, LLP; James D. Miller (57) ABSTRACT

An electric compressor including: a housing; a compression mechanism which compresses refrigerant within the housing; and a motor which provides a driving force to the compression mechanism. The motor includes a stator supported on the housing and a rotor rotated by interaction with the stator. The rotor includes a core in which a magnet is installed, a balance weight installed at an end of the core to adjust the rotation balance of the rotor, a cover that covers the core between the core and the balance weight, and a refrigerant flow path through which the refrigerant sequentially flows through the balance weight, the cover, and the core. As a result, it is possible to suppress the performance degradation and the loss of operational capability of the motor by suppressing the temperature rise of the magnet provided in the rotor of the motor and the consequent demagnetization phenomenon.

9 Claims, 10 Drawing Sheets

(56) References Cited

U.S. PATENT DOCUMENTS

| | | | | |
|---|---|---|---|---|
| 2017/0077772 A1* | 3/2017 | Izumi | ............ | H02K 7/04 |
| 2020/0291940 A1* | 9/2020 | Stephens | ............ | F04C 23/008 |
| 2021/0062811 A1* | 3/2021 | Yamashita | ............ | F04C 23/008 |

FOREIGN PATENT DOCUMENTS

| | | | | | |
|---|---|---|---|---|---|
| JP | 2016089648 A | | 5/2016 | | |
| JP | 2021106455 A | * | 7/2021 | ............ | H02K 1/28 |
| JP | 2021095875 A | | 8/2021 | | |
| KR | 20120117552 A | | 10/2012 | | |
| KR | 20140088257 A | * | 7/2014 | ............ | H02K 1/2766 |
| KR | 102051097 B1 | | 12/2019 | | |

\* cited by examiner

ELECTRIC COMPRESSOR

CROSS REFERENCE TO RELATED PATENT APPLICATIONS

This is a U.S. national phase patent application of PCT/KR2023/004991 filed Apr. 13, 2023 which claims the benefit of and priority to Korean Patent Application No. 10-2022-0119520, filed on Sep. 21, 2022, the entire contents of each of which are incorporated herein by reference for all purposes.

TECHNICAL FIELD

The present disclosure relates to an electric compressor and more particularly to an electric compressor capable of compressing a refrigerant by a driving force of a motor.

BACKGROUND ART

In general, a compressor is a device for compressing a fluid such as a refrigerant gas, etc., and is applied to an air-conditioning system of a building, an air-conditioning system for a vehicle, etc.

The compressor may be divided, according to a compression type, into a reciprocating type compressor that compresses the refrigerant through a reciprocating motion of a piston and a rotary type compressor that compresses the refrigerant while rotating. The reciprocating type compressor may be divided into a crank type compressor that transmits power to a plurality of pistons by using a crank according to a power transmission method, a swash plate type compressor that transmits power to a rotating shaft on which the swash plate is installed, etc. The rotary type compressor may be divided into a vane rotary type compressor using a rotating shaft and a vane and a scroll type compressor using an orbiting scroll and a fixed scroll.

Also, the compressor may be divided according to a driving method into a mechanical compressor that uses an engine and an electric compressor that uses a motor.

Figure 1:
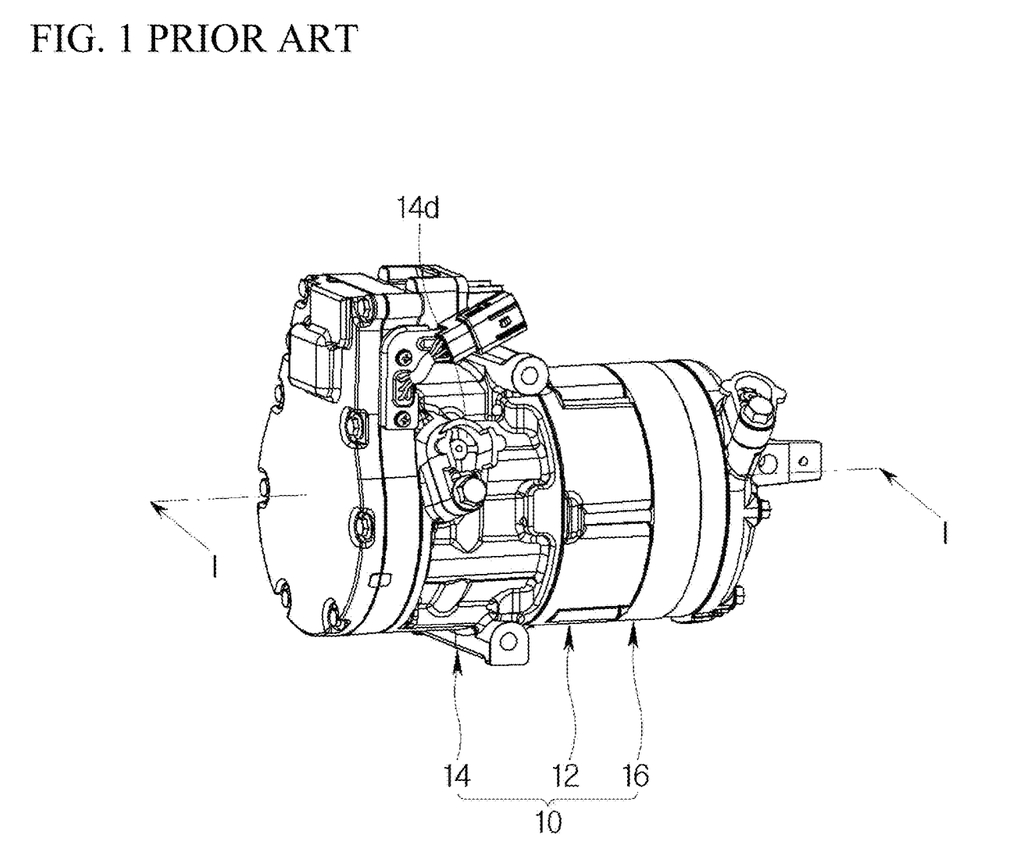
FIG. 1 is a perspective view showing a conventional electric compressor.
Figure 2:
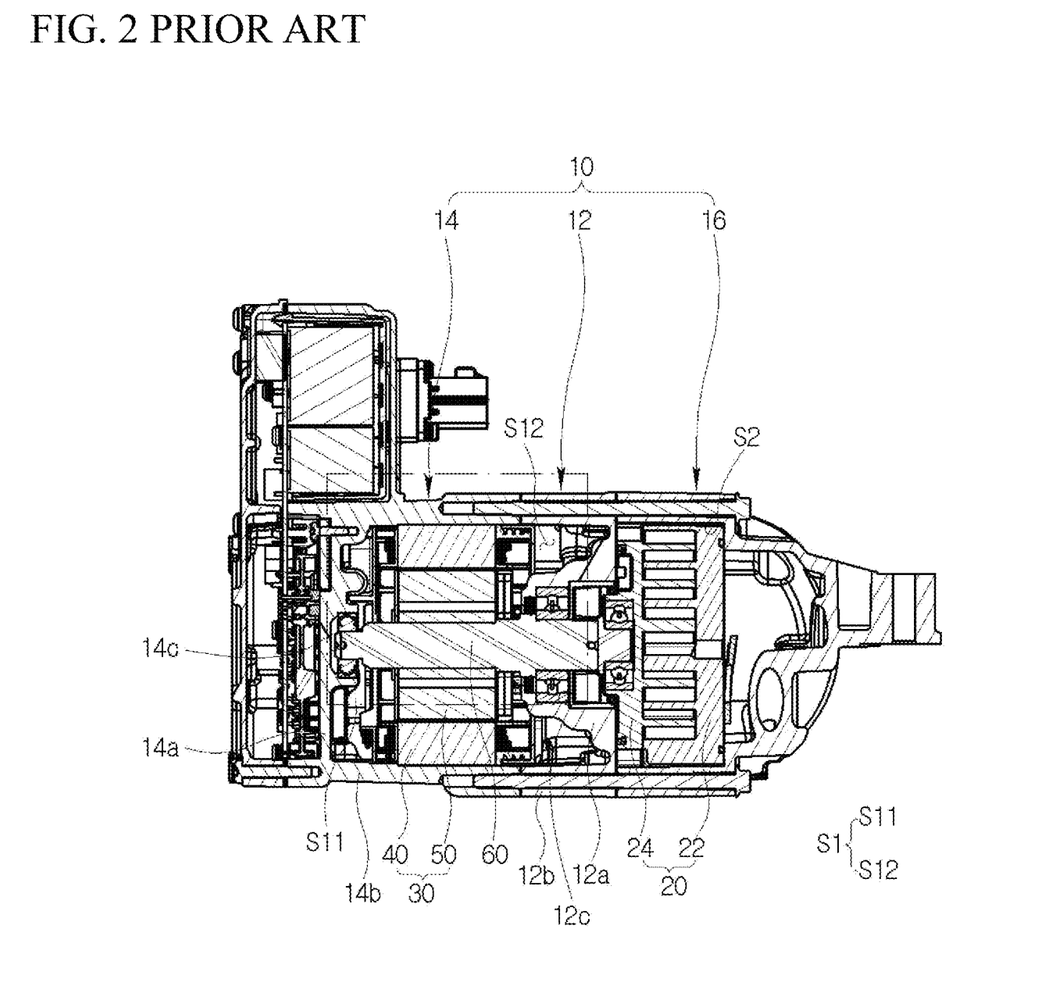
FIG. 2 is a cross-sectional view taken along line I-I of FIG. 1.
Figure 3:
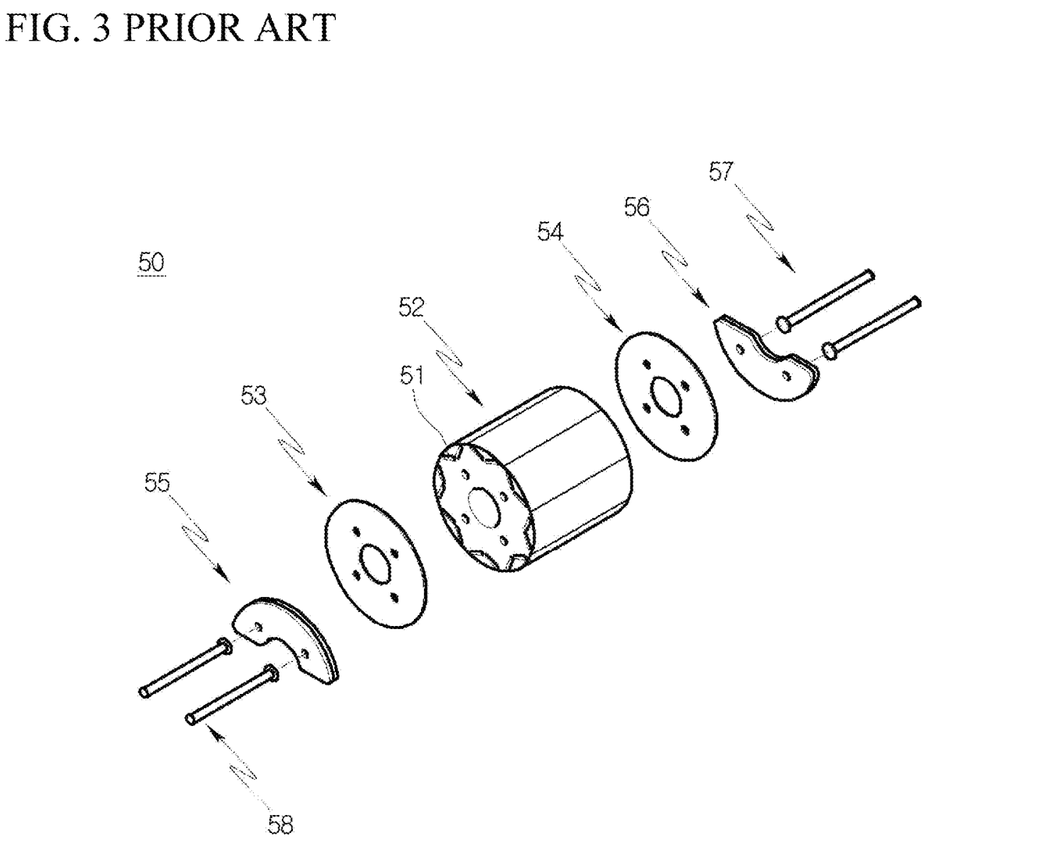
FIG. 3 is an exploded perspective view of a rotor shown in FIG. 2.

FIG. 1 is a perspective view showing a conventional electric compressor. FIG. 2 is a cross-sectional view taken along line I-I of FIG. 1. FIG. 3 is an exploded perspective view of a rotor shown in FIG. 2.

Referring to the attached FIGS. 1 to 3, the conventional electric compressor includes a housing 10, a compression mechanism 20 that compresses refrigerant within the housing 10, a motor 30 that generates a driving force required to drive the compression mechanism 20, and a rotary shaft 60 that transmits the driving force of the motor 30 to the compression mechanism 20.

Here, the motor 30 includes a stator 40 supported on the housing 10 and a rotor 50 that is rotated by interaction with the stator 40. The rotor 50 includes a core 52 in which a magnet 51 is installed, balance weights 55 and 56 installed at the end of the core 52 to adjust the rotation balance of the rotor 50, covers 53 and 54 that cover the core 52 between the core 52 and the balance weights 55 and 56, and fastening members 57 and 58 that fasten the core 52, the covers 53 and 54, and the balance weights 55 and 56.

However, in such a conventional electric compressor, there is a problem that the temperature of the magnet 51 provided in the rotor 50 of the motor 30 rises, so that a demagnetization phenomenon causing a decrease in magnetic force occurs, the performance of the motor 30 is degraded, and operational capability is lost.

SUMMARY

Therefore, the purpose of the present disclosure is to provide an electric compressor capable of suppressing the performance degradation of the motor and the loss of operational capability by suppressing the temperature rise of the magnet provided in the rotor of the motor and the consequent demagnetization phenomenon.

One embodiment is an electric compressor including: a housing; a compression mechanism which compresses refrigerant within the housing; a motor which provides a driving force to the compression mechanism. The motor includes a stator supported on the housing and a rotor rotated by interaction with the stator. The rotor includes a core in which a magnet is installed, a balance weight installed at an end of the core to adjust the rotation balance of the rotor, a cover that covers the core between the core and the balance weight, and a refrigerant flow path through which the refrigerant sequentially flows through the balance weight, the cover, and the core.

The core may include a plurality of core refrigerant holes which pass through the core respectively in an axial direction and are disposed to be spaced apart from each other in a circumferential direction of the core. The cover may include a plurality of cover refrigerant holes which pass through the cover respectively in the axial direction and are disposed to be spaced apart from each other in a circumferential direction of the cover. The plurality of core refrigerant holes may communicate with the plurality of cover refrigerant holes. At least a portion of the plurality of cover refrigerant holes may communicate with a motor receiving space which receives the motor and the refrigerant.

The core may include a plurality of core bridges that are disposed one by one each between the plurality of core refrigerant holes, and a plurality of core fastening holes that pass through the plurality of core bridges in the axial direction respectively. The cover may include a plurality of cover bridges that are disposed one by one each between the plurality of cover refrigerant holes, and a plurality of cover fastening holes that pass through the plurality of cover bridges in the axial direction respectively. The plurality of core fastening holes may communicate with the plurality of cover fastening holes. A portion of the plurality of cover fastening holes may communicate with the motor receiving space.

The balance weight is formed smaller than the cover, so that a portion of the plurality of cover refrigerant holes and the plurality of cover fastening holes may communicate with the motor receiving space.

The balance weight may include a plurality of balance weight fastening holes which pass through the balance weight in the axial direction respectively and are disposed to be spaced apart from each other in a circumferential direction of the balance weight. The number of the plurality of balance weight fastening holes may be less than the number of the plurality of the cover fastening holes. The cover fastening holes of which the number is the same as the number of the plurality of balance weight fastening holes among the plurality of the cover fastening holes may communicate with the plurality of balance weight fastening holes.

The core fastening holes of which the number is the same as the number of the plurality of balance weight fastening holes among the plurality of core fastening holes may communicate with the cover fastening holes of which the number is the same as the number of the plurality of balance weight fastening holes. The core, the cover, and the balance weight may be assembled by a plurality of fastening members which are inserted into the plurality of balance weight fastening holes, the core fastening holes of which the number is the same as the number of the plurality of balance weight fastening holes, and the cover fastening holes of which the number is the same as the number of the plurality of balance weight fastening holes.

The plurality of core fastening holes and the plurality of the cover fastening holes may be formed at an equal interval in the circumferential direction of the rotor.

Remaining core fastening holes into which the plurality of fastening members is not inserted among the plurality of core fastening holes may communicate with remaining cover fastening holes into which the plurality of fastening members is not inserted among the plurality of cover fastening holes. At least a portion of the remaining cover fastening holes may communicate with the motor receiving space.

The remaining cover fastening hole may include an overlapping fastening hole disposed at a position overlapping the balance weight in the axial direction. The plurality of cover refrigerant holes may include an overlapping refrigerant hole disposed at a position overlapping the balance weight in the axial direction. The balance weight may further include a balance weight refrigerant hole which passes through the balance weight in the axial direction and communicates with at least one of the overlapping fastening hole and the overlapping refrigerant hole.

The motor receiving space may include a first space where one end of the rotor is disposed and the refrigerant is introduced from the outside of the housing, and a second space in which the other end of the rotor is disposed and which guides the refrigerant of the motor receiving space to the compression mechanism. The balance weight may include a first balance weight disposed in the first space, and a second balance weight disposed in the second space. The first balance weight may be formed in such a manner as not to overlap the second balance weight in the axial direction.

A portion of the plurality of cover refrigerant holes may be formed in such a manner as not to overlap the first balance weight and the second balance weight in the axial direction.

A portion of the remaining cover fastening holes may be formed in such a manner as not to overlap the first balance weight and the second balance weight in the axial direction.

The number of first balance weight refrigerant holes, that is, the balance weight refrigerant hole of the first balance weight, may be different from the number of second balance weight refrigerant holes, that is, the balance weight refrigerant hole of the second balance weight.

The number of first balance weight refrigerant holes may be greater than the number of second balance weight refrigerant holes.

The plurality of core refrigerant holes, the plurality of core fastening holes, the plurality of cover refrigerant holes, the plurality of balance weight fastening holes, and the balance weight refrigerant hole may be formed closer to the center than the magnet in a direction of rotation radius of the rotor.

The electric compressor according to the embodiment of the present disclosure includes: a housing; a compression mechanism which compresses refrigerant within the housing; a motor which provides a driving force to the compression mechanism. The motor includes a stator supported on the housing and a rotor that is rotated by interaction with the stator. The rotor includes a core in which a magnet is installed, a balance weight installed at an end of the core to adjust the rotation balance of the rotor, a cover that covers the core between the core and the balance weight, and a refrigerant flow path through which the refrigerant sequentially flows through the balance weight, the cover, and the core. As a result, it is possible to suppress the performance degradation of the motor and the loss of operational capability by suppressing the temperature rise of the magnet provided in the rotor of the motor and the consequent demagnetization phenomenon.

DESCRIPTION OF AN EMBODIMENT

Hereinafter, an electric compressor according to an embodiment of the present disclosure will be described in detail with reference to the accompanying drawings.

Figure 4:
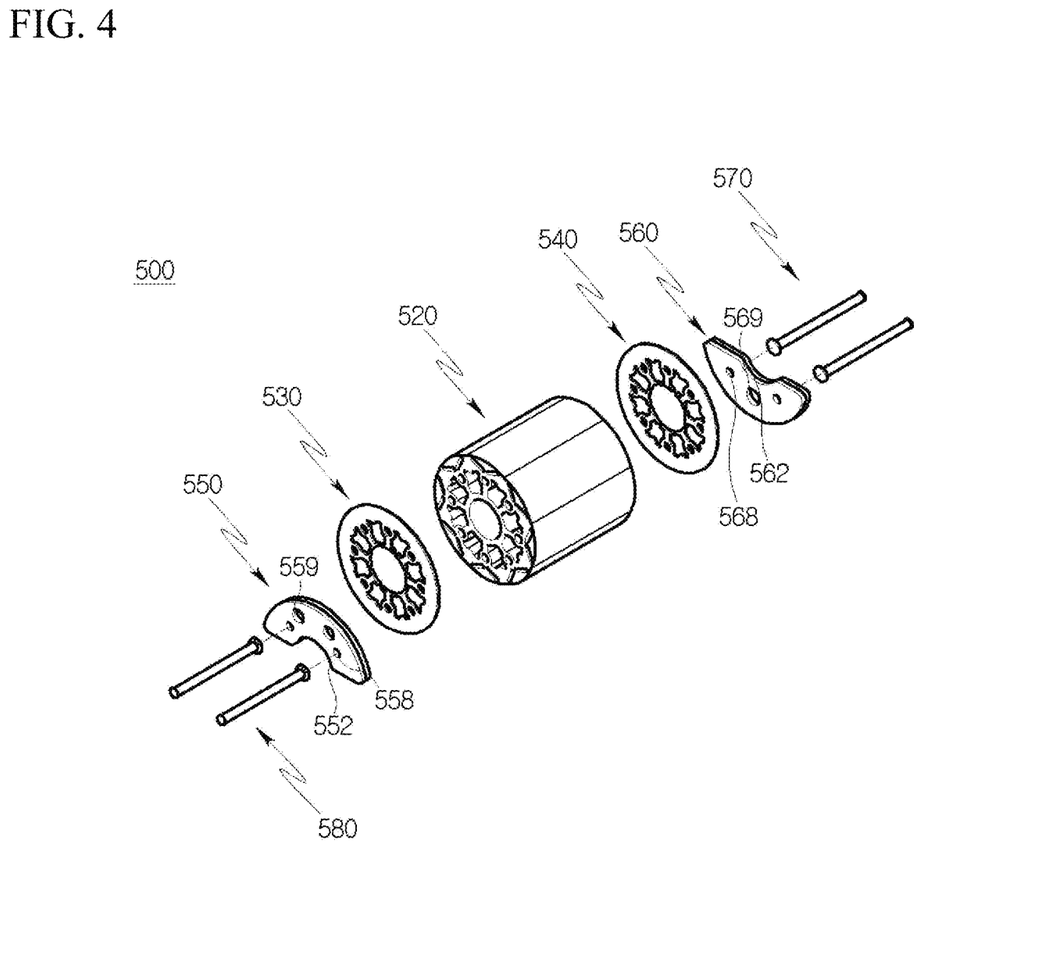
FIG. 4 is an exploded perspective view showing a rotor of an electric compressor according to an embodiment of the present disclosure.
Figure 5:
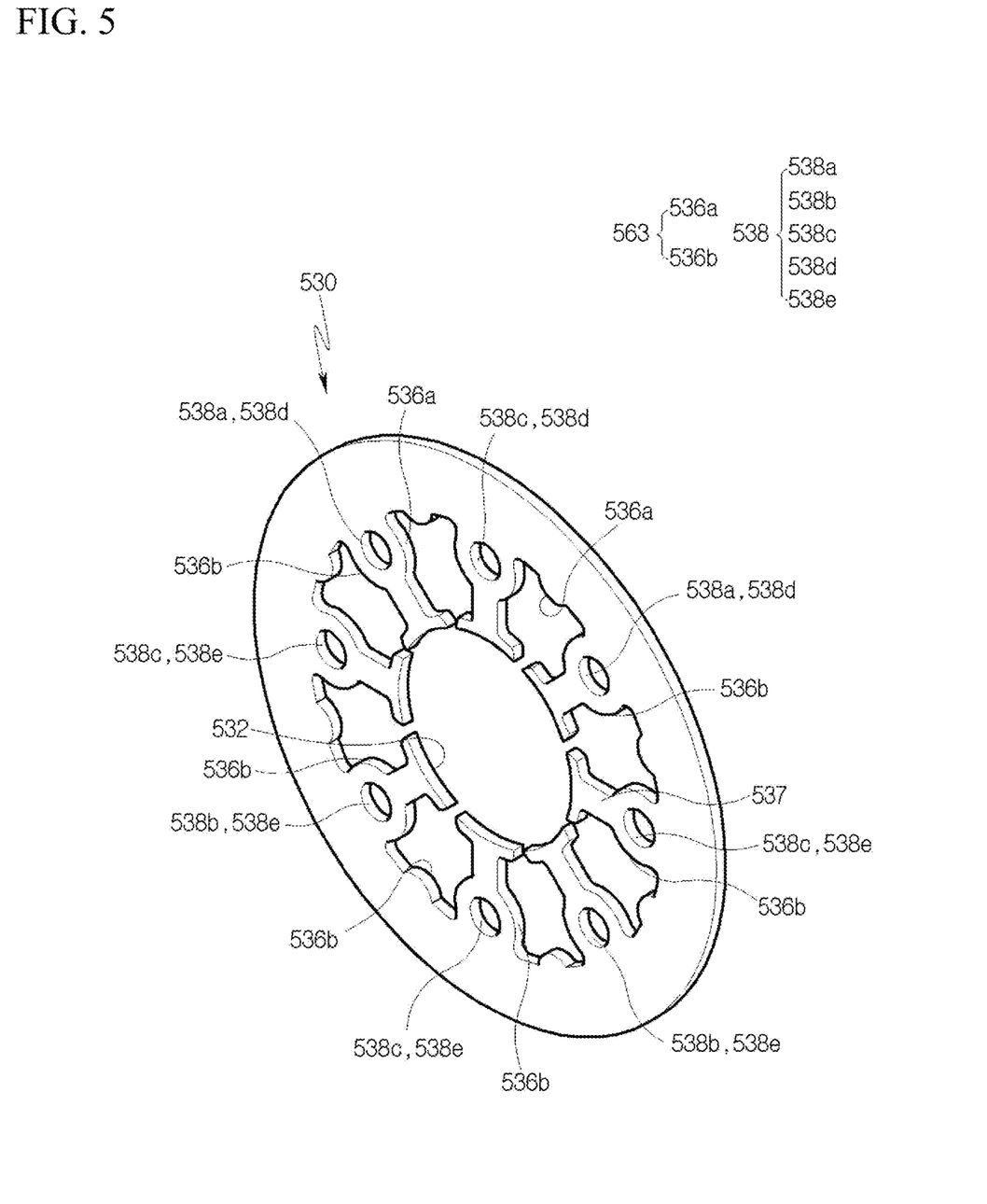
FIG. 5 is a perspective view showing a first cover of FIG. 4.
Figure 6:
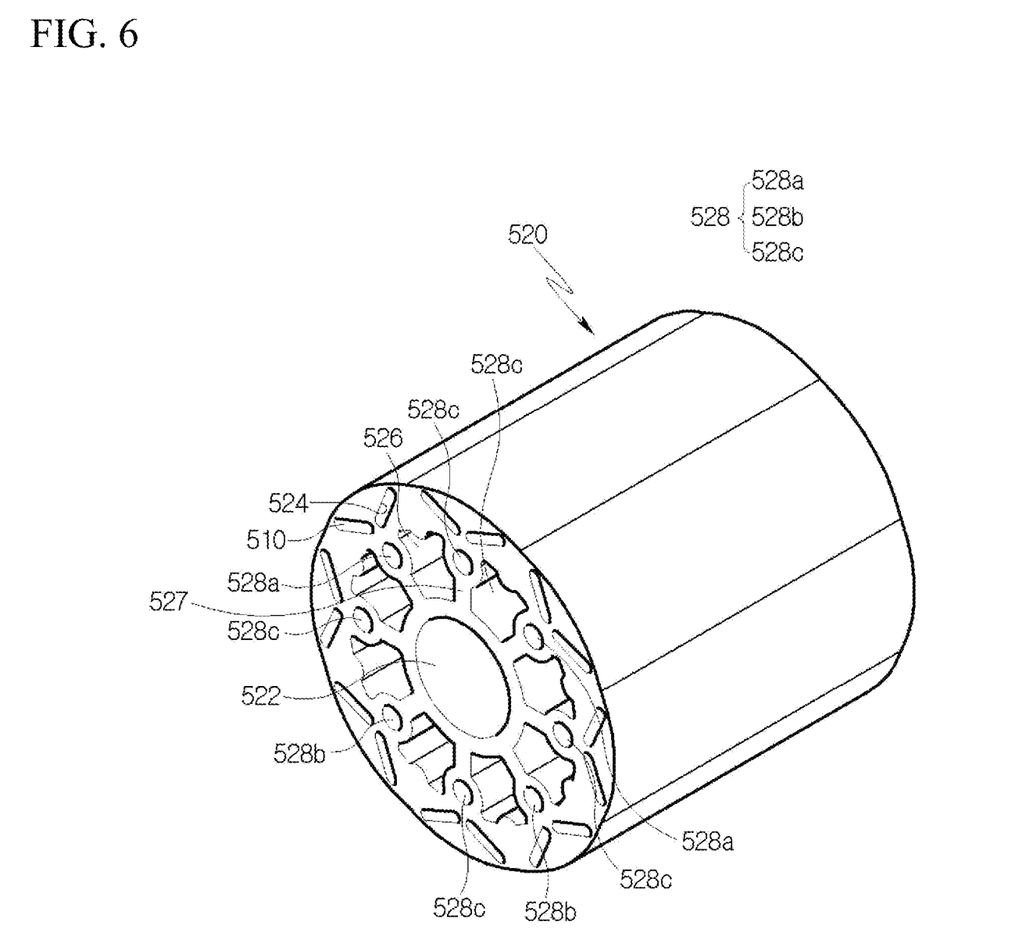
FIG. 6 is a perspective view showing a core of FIG. 4.
Figure 7:
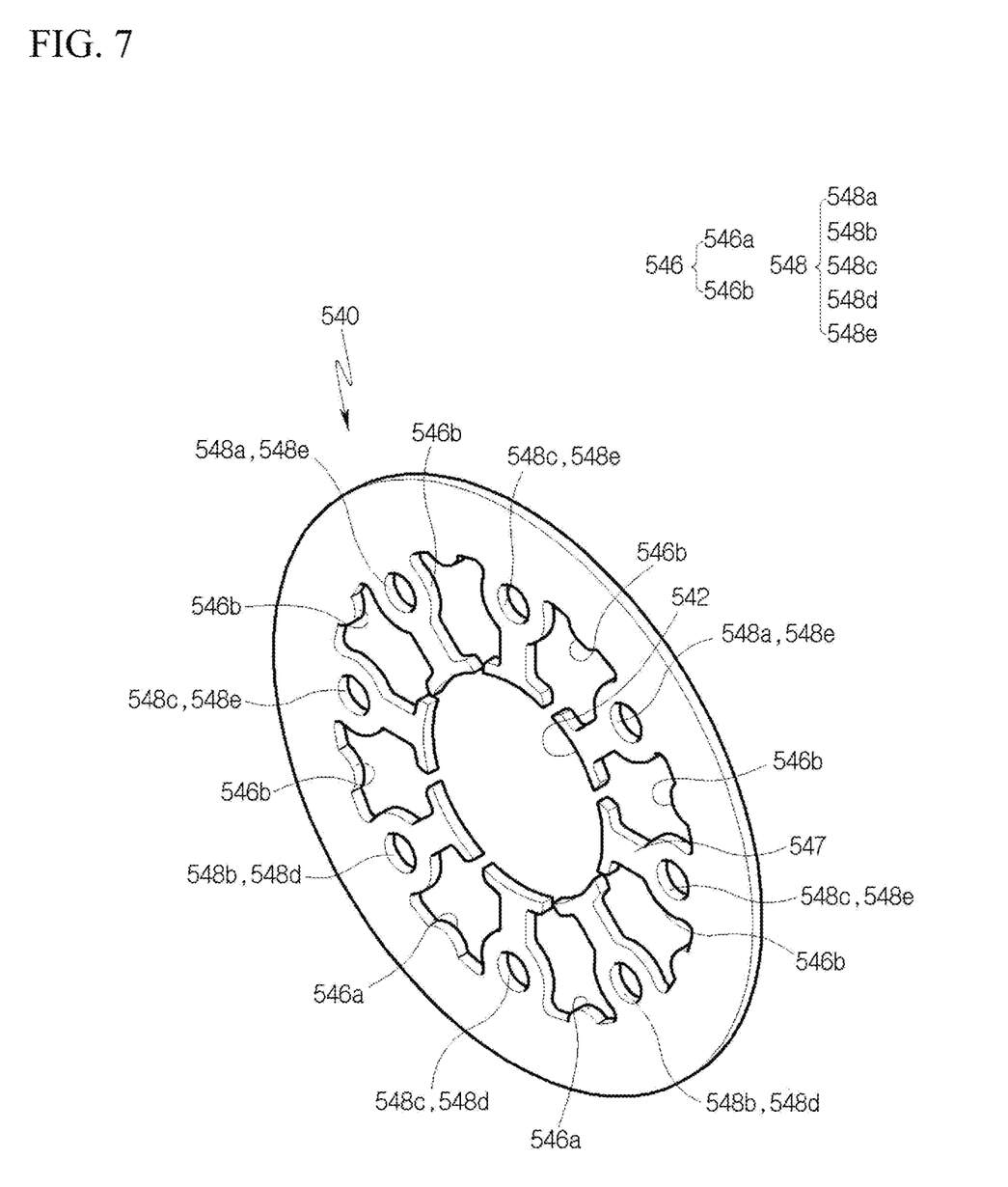
FIG. 7 is a perspective view showing a second cover of FIG. 4.
Figure 8:
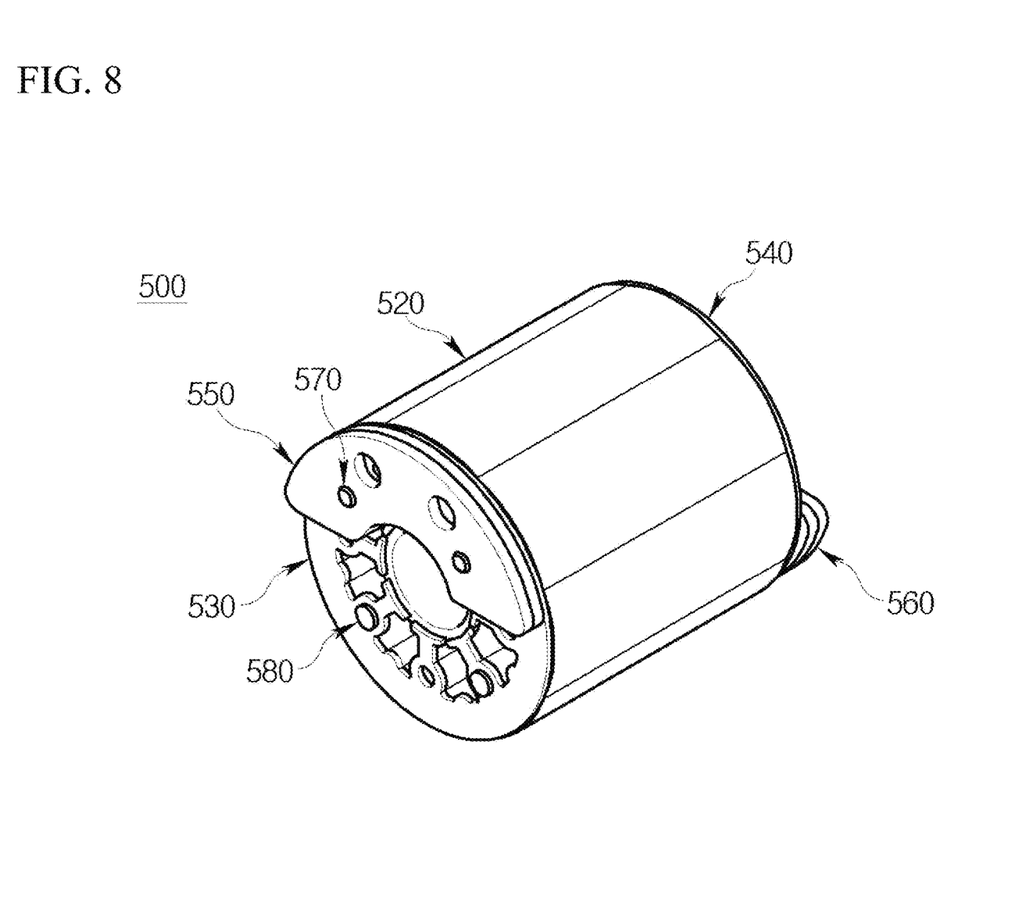
FIG. 8 is a perspective view showing a state where a rotor of FIG. 4 is assembled.
Figure 9:
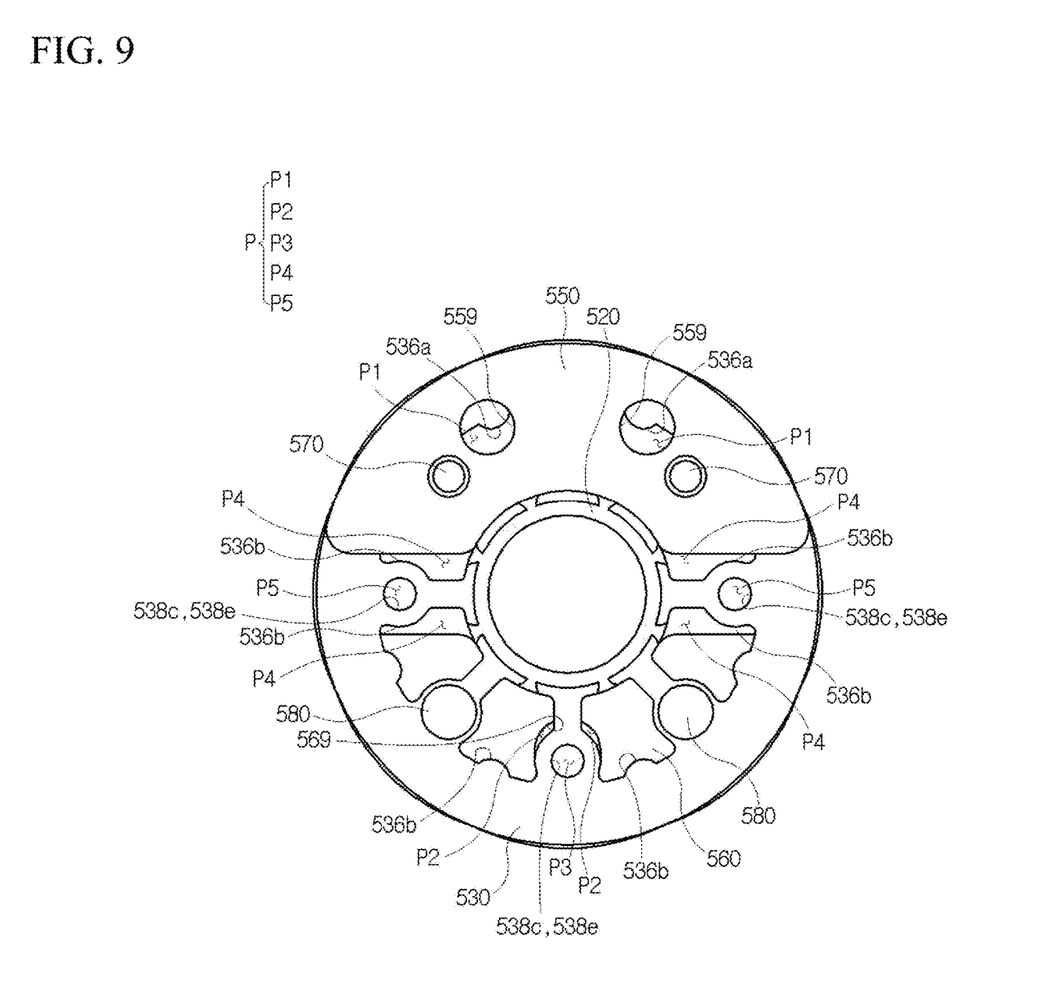
FIG. 9 is a left side view of FIG. 8.
Figure 10:
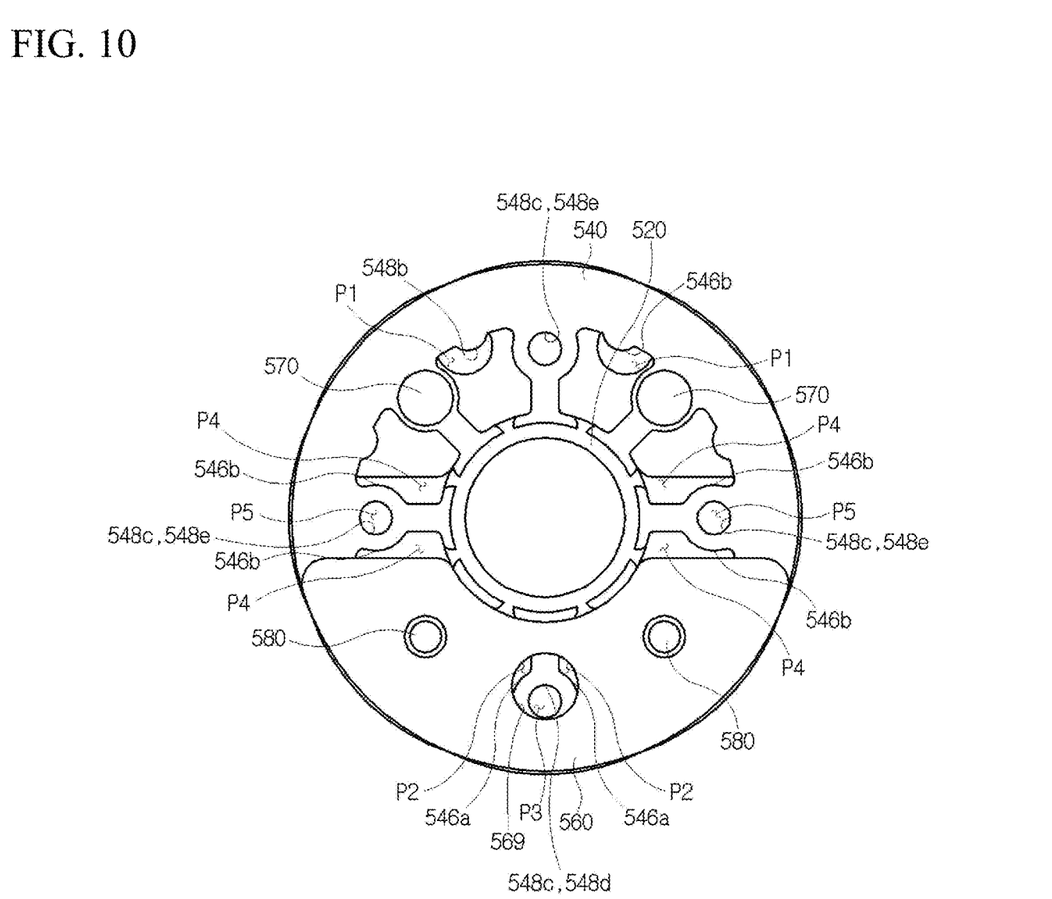
FIG. 10 is a right side view of FIG. 8.

FIG. 4 is an exploded perspective view showing a rotor of an electric compressor according to an embodiment of the present disclosure. FIG. 5 is a perspective view showing a first cover of FIG. 4. FIG. 6 is a perspective view showing a core of FIG. 4. FIG. 7 is a perspective view showing a second cover of FIG. 4. FIG. 8 is a perspective view showing a state where a rotor of FIG. 4 is assembled. FIG. 9 is a left side view of FIG. 8. FIG. 10 is a right side view of FIG. 8.

Meanwhile, for convenience of description, reference is made to FIGS. 1 and 2 for the description of components unshown in FIGS. 4 to 10.

Referring to the attached FIGS. 4 to 10, FIG. 1, and FIG. 2, an electric compressor according to the embodiment of the present disclosure may include a housing 10, a compression mechanism 20 that compresses refrigerant within the housing 10, a motor 30 that generates a driving force required for the compression mechanism 20, and a rotary shaft 60 that transmits the driving force of the motor 30 to the compression mechanism 20.

The housing 10 may include a center housing 12, a front housing 14 which is coupled to the center housing 12 and forms a motor receiving space S1 in which the motor 30 is received, and a rear housing 16 which is coupled to the center housing 12 on the opposite side of the front housing 14 based on the center housing 12, forms a compression mechanism receiving space S2 in which the compression mechanism 20 is received, and includes a discharge chamber that receives refrigerant discharged from the compression mechanism 20.

The center housing 12 may include a center housing partition wall 12a that partitions the motor receiving space S1 and the compression mechanism receiving space S2, and a center housing side wall 12b that extends along the outer circumference of the center housing partition wall 12a. The center housing partition wall 12a may include a shaft receiving hole 12c into which one end of the rotary shaft 60 is inserted, and a communication hole (not shown) that communicates the motor receiving space S1 and the compression mechanism receiving space S2.

The front housing 14 may include a front housing partition wall 14a facing the center housing partition wall 12a, and a front housing side wall 14b that extends along the outer circumference of the front housing partition wall 14a and is fastened to the center housing side wall 12b.

The front housing partition wall 14a may have a shaft receiving groove 14c into which the other end of the rotary shaft 60 is inserted.

The front housing side wall 14b may have an intake port 14d that introduces the refrigerant from the outside of the housing 10 into the motor receiving space S1.

Here, the motor receiving space S1 may include a first space S11 that communicates with the intake port 14d and a second space S12 that communicates with the compression mechanism receiving space S2 in order to guide the refrigerant of the motor receiving space S1 to the compression mechanism 20. One end of a rotor 500 to be described later may be disposed in the first space S11, and the other end of the rotor 500 to be described later may be disposed in the second space S12.

The compression mechanism 20 may include a fixed scroll 22 that is fixedly installed and an orbiting scroll 24 that is engaged with the fixed scroll 22 to form, together with the fixed scroll 22, a compression chamber, and performs an orbiting motion by the rotary shaft 60. Here, in the embodiment, the compression mechanism 20 is formed in a so-called scroll type, and is not limited to this. The compression mechanism 4 may be formed in different types such as in a reciprocating type, in a vane rotary type, etc.

The motor 30 may include a stator 40 which is supported on the front housing side wall 14b and a rotor 500 which is located within the stator 40 and is rotated by interaction with the stator 40.

Here, the rotor 500 may include a core 520 in which a magnet 510 is installed, balance weights 550 and 560 installed at the end of the core 520 to adjust the rotation balance of the rotor 500, and covers 530 and 540 that cover the core 520 between the core 520 and the balance weights 550 and 560.

The core 520 may be formed in a cylindrical shape by stacking a plurality of iron cores in the axial direction.

Also, the core 520 may include a core center hole 522 that passes through the core 520 at the center of the core 520 in the axial direction, a plurality of magnet grooves 524 that respectively receive the magnets 510 and are spaced apart from each other in the circumferential direction of the core 520, n number of core refrigerant holes 526 that respectively pass through the core 520 between the plurality of magnet grooves 524 and the core center hole 522 in the axial direction and are spaced apart from each other in the circumferential direction of the core 520, n number of core bridges 527 that are disposed one by one each between the n number of core refrigerant holes 526, and n number of core fastening holes 528 that pass through the n number of core bridges 527 in the axial direction respectively.

Here, the plurality of magnet grooves 524, the n number of core refrigerant holes 526, the n number of core bridges 527, and the n number of core fastening holes 528 may be disposed at an equal interval in the circumferential direction of the core 520, respectively.

Also, the core fastening hole 528 may be formed to have a circular cross-section, and the core refrigerant hole 526 may be formed to have a plurality of curved surfaces.

Also, the core refrigerant hole 526 may be formed to be larger than the core fastening hole 528.

The covers 530 and 540 may include a first disc-shaped cover 530 that covers one end of the core 520 and is disposed in the first space S11, and a second disc-shaped cover 540 that covers the other end of the core 520 and is disposed in the second space S12.

The first cover 530 may include a first cover center hole 532 that passes through the first cover 530 at the center of the first cover 530 in the axial direction and communicates with the core center hole 522, n number of first cover refrigerant holes 536 that respectively pass through the first cover 530 in the axial direction, are spaced apart from each other in the circumferential direction of the first cover 530, and communicate with the n number of core refrigerant holes 526, n number of first cover bridges 537 that are disposed one by one each between the n number of first cover refrigerant holes 536 and face the n number of core bridges 527, and n number of first cover fastening holes 538 that pass through the n number of first cover bridges 537 in the axial direction, respectively, and communicate with the n number of core fastening holes 528.

Here, the n number of first cover refrigerant holes 536, the n number of first cover bridges 537, the n number of first cover fastening holes 538 may be disposed at an equal interval in the circumferential direction of the first cover 530, respectively.

Also, the first cover refrigerant hole 536 may be formed in the same size and in the same shape as those of the core refrigerant hole 526, and the first cover fastening hole 538 may be formed in the same size and in the same shape as those of the core fastening hole 528, so that the first cover refrigerant hole 536 may be formed to be larger than the first cover fastening hole 538.

The second cover 540 may be formed similarly to the first cover 530.

Specifically, the second cover 540 may include a second cover center hole 542 that passes through the second cover 540 at the center of the second cover 540 in the axial direction and communicates with the core center hole 522, n number of second cover refrigerant holes 546 that respectively pass through the second cover 540 in the axial direction, are spaced apart from each other in the circumferential direction of the second cover 540, and communicate with the n number of core refrigerant holes 526, n number of second cover bridges 547 that are disposed one by one each between the n number of second cover refrigerant holes 546 and face the n number of core bridges 527, and n number of second cover fastening holes 548 that pass through the n number of second cover bridges 547 in the axial direction, respectively, and communicate with the n number of core fastening holes 528.

Here, the n number of second cover refrigerant holes 546, the n number of second cover bridges 547, and the n number of second cover fastening holes 548 may be disposed at an equal interval in the circumferential direction of the second cover 540, respectively.

Also, the second cover refrigerant hole 546 may be formed in the same size and in the same shape as those of the core refrigerant hole 526, and the second cover fastening hole 548 may be formed in the same size and in the same shape as those of the core fastening hole 528, so that the second cover refrigerant hole 546 may be formed to be larger than the second cover fastening hole 548.

The balance weights 550 and 560 may include the first balance weight 550 and the second balance weight 560. The first balance weight 550 is coupled to the first cover 530 on the opposite side of the core 520 based on the first cover 530 and is disposed in the first space S11. The second balance weight 560 is coupled to the second cover 540 on the opposite side of the core 520 based on the second cover 540 and is disposed in the second space S12.

The first balance weight 550 may be formed in an arc shape that is smaller than half (semicircle) of the first cover 530. That is, the center of curvature of the first balance weight 550 may be disposed concentrically with the center of the first cover 530, and the radius of the outer peripheral surface of the first balance weight 550 may be formed at an equal level to the radius of the outer peripheral surface of the first cover 530. Also, the length of a circular arc of the outer peripheral surface of the first balance weight 550 may be formed to be less than half of the circumferential length of the outer peripheral surface of the first cover 530.

Also, the first balance weight 550 may include a first balance weight center hole 552, m number of first balance weight fastening holes 558, and a first balance weight refrigerant hole 559. The first balance weight center hole 552 passes through the first balance weight 550 at the center of curvature of the first balance weight 550 in the axial direction and communicates with the first cover center hole 532. The m number of first balance weight fastening holes 558 respectively pass through the first balance weight 550 in the axial direction and are spaced apart from each other in the circumferential direction of the first balance weight 550. The first balance weight refrigerant hole 559 passes through the first balance weight 550 in the axial direction at a position spaced apart from the m number of first balance weight fastening holes 558.

Here, the "m" is a smaller number than "n". m number of first cover fastening holes 538a out of the n number of first cover fastening holes 538 may communicate with the m number of first balance weight fastening holes 558, and m number of core fastening holes 528a out of the n number of core fastening holes 528 may communicate with the m number of first cover fastening holes 538a. The core 520, the first cover 530, and the first balance weight 550 may be assembled by the m number of core fastening holes 528a, the m number of first cover fastening holes 538a, and m number of first fastening members 570 inserted into the m number of first balance weight fastening holes 558.

Here, n-m number of core fastening holes 528b and 528c into which the m number of first fastening members 570 are not inserted out of the n number of core fastening holes 528 communicate with n-m number of first cover fastening holes 538b and 538c into which the m number of first fastening members 570 are not inserted out of the n number of first cover fastening holes 538. The n-m number of first cover fastening holes 538b and 538c may be divided into a first cover overlapping fastening hole 538d disposed at a position overlapping the first balance weight 550 in the axial direction and a first cover non-overlapping fastening hole 538e disposed at a position not overlapping the first balance weight 550 in the axial direction.

Also, the n number of first cover refrigerant holes 536 may be divided into a first cover overlapping refrigerant hole 536a disposed at a position overlapping the first balance weight 550 in the axial direction and a first cover non-overlapping refrigerant hole 536b disposed at a position not overlapping the first balance weight 550 in the axial direction.

Here, the first balance weight refrigerant hole 559 may be formed in plural numbers, the plural first balance weight refrigerant holes 559 may be spaced apart from each other in the circumferential direction of the first balance weight 550, and the plural first balance weight refrigerant holes 559 may communicate with the first cover overlapping refrigerant hole 536a, respectively.

The second balance weight 560 may be formed similarly to the first balance weight 550 but may be formed in such a manner as not to overlap the first balance weight 550 in the axial direction.

Specifically, the second balance weight 560 may be formed in an arc shape that is smaller than half (semicircle) of the second cover 540. That is, the center of curvature of the second balance weight 560 may be disposed concentrically with the center of the second cover 540, and the radius of the outer peripheral surface of the second balance weight 560 may be formed at an equal level to the radius of the outer peripheral surface of the second cover 540. Also, the length of a circular arc of the outer peripheral surface of the second balance weight 560 may be formed to be less than half of the circumferential length of the outer peripheral surface of the second cover 540.

Also, the second balance weight 560 may be disposed on the opposite side of the first balance weight 550 based on the rotary shaft 60 of the rotor 500.

Also, the second balance weight 560 may include a second balance weight center hole 562, m number of second balance weight fastening holes 568, and a second balance weight refrigerant hole 569. The second balance weight center hole 562 passes through the second balance weight 560 at the center of curvature of the second balance weight 560 in the axial direction and communicates with the second cover center hole 542. The m number of second balance weight fastening holes 568 respectively pass through the second balance weight 560 in the axial direction and are spaced apart from each other in the circumferential direction of the second balance weight 560. The second balance weight refrigerant hole 569 passes through the second balance weight 560 in the axial direction at a position spaced apart from the m number of second balance weight fastening holes 568.

Here, m number of second cover fastening holes 548b out of the n number of second cover fastening holes 548 may communicate with the m number of second balance weight fastening holes 568, and the m number of core fastening holes 528b out of the n-m number of core fastening holes 528b and 528c may communicate with the m number of second cover fastening holes 548b. The core 520, the second cover 540, and the second balance weight 560 may be assembled by the m number of core fastening holes 528b, the m number of second cover fastening holes 548b, and m number of second fastening members 580 inserted into the m number of second balance weight fastening holes 568.

Here, n-m number of core fastening holes 528a and 528c into which the m number of second fastening members 580 are not inserted out of the n number of core fastening holes 528 communicate with n-m number of second cover fastening holes 548a and 548c into which the m number of second fastening members 580 are not inserted out of the n number of second cover fastening holes 548. The n-m number of second cover fastening holes 548a and 548c may be divided into a second cover overlapping fastening hole 548d disposed at a position overlapping the second balance weight 560 in the axial direction and a second cover non-overlapping fastening hole 548e disposed at a position not overlapping the second balance weight 560 in the axial direction.

Also, the n number of second cover refrigerant holes 546 may be divided into a second cover overlapping refrigerant hole 546a disposed at a position overlapping the second balance weight 560 in the axial direction and a second cover non-overlapping refrigerant hole 546b disposed at a position not overlapping the second balance weight 560 in the axial direction.

Here, the second balance weight refrigerant hole 569 of which the number is less than the number of the plural first balance weight refrigerant holes 559 may be formed. The second balance weight refrigerant hole 569 may communicate with the second cover overlapping fastening hole 548d and the second cover overlapping refrigerant hole 546a.

Meanwhile, the first cover 530 and the second cover 540 are formed to have the same size, and the first balance weight 550 is formed to be smaller than half of the first cover 530. The second balance weight 560 is formed to be smaller than half of the second cover 540, and the first balance weight 550 and the second balance weight 560 are disposed in the axial direction in such a manner as not to overlap each other. Accordingly, a portion of the n number of core refrigerant holes 526 may communicate simultaneously with a portion of the first cover non-overlapping refrigerant hole 536b and a portion of the second cover non-overlapping refrigerant hole 546b. Also, a portion of n-2m number of core fastening holes 528c into which the m number of first fastening members 570 and the m number of second fastening members 580 are not inserted among the n number of core fastening holes 528 may communicate simultaneously with a portion of the first cover non-overlapping fastening hole 538e and a portion of the second cover non-overlapping fastening hole 548e. That is, a portion of the n number of core refrigerant holes 526 and a portion of the n-2m number of core fastening holes 528c may not overlap the first balance weight 550 and the second balance weight 560 in the axial direction.

The rotary shaft 60 may be coupled to the rotor 500. Also, the rotary shaft 60 may pass through the first balance weight center hole 552, the first cover center hole 532, the second cover center hole 542, and the second balance weight center hole 562, so that one end of the rotary shaft 60 may be inserted into the shaft receiving hole 12c and the other end may be inserted into the shaft receiving groove 14c.

Hereinafter, the operational effect of the electric compressor according to the embodiment will be described.

That is, when power is applied to the motor 30, the rotor 500 and the rotary shaft 60 rotate and transmit a driving force to the compression mechanism 20, and low-temperature and low-pressure refrigerant is introduced into the motor receiving space S1 through the intake port 14d. The refrigerant in the motor receiving space S1 is introduced into the compression mechanism 20 and is compressed to a high temperature and high pressure, and then discharged to the outside of the housing 10.

In this process, the temperature of the rotor 500 may rise.

Considering this, in the embodiment, the rotor 500 may include a refrigerant flow path P through which the refrigerant in the motor receiving space S1 may sequentially flow through the balance weights 550 and 560, the covers 530 and 540, and the core 520.

Specifically, the first balance weight refrigerant hole 559, the first cover overlapping refrigerant hole 536a communicating with the first balance weight refrigerant hole 559, the core refrigerant hole 526, the second cover non-overlapping refrigerant hole 546b (hereinafter, referred to as a first refrigerant flow path P1) may communicate with the motor receiving space S1, so that the refrigerant in the motor receiving space S1 may flow through the inside of the rotor 500 through the first refrigerant flow path P1.

Also, the second balance weight refrigerant hole 569, the second cover overlapping refrigerant hole 546a communicating with the second balance weight refrigerant hole 569, the core refrigerant hole 526, the first cover non-overlapping refrigerant hole 536b (hereinafter, referred to as a second refrigerant flow path P2) may communicate with the motor receiving space S1, so that the refrigerant in the motor receiving space S1 may flow through the inside of the rotor 500 through the second refrigerant flow path P2.

Also, the second balance weight refrigerant hole 569, the second cover overlapping fastening hole 548d communicating with the second balance weight refrigerant hole 569, the core fastening hole 528, and the first cover non-overlapping fastening hole 538e (hereinafter, referred to as a third refrigerant flow path P3) may communicate with the motor receiving space S1, so that the refrigerant in the motor receiving space S1 may flow through the inside of the rotor 500 through the third refrigerant flow path P3.

Also, the first cover non-overlapping refrigerant hole 536b, the n number of core refrigerant holes 526, and the second cover non-overlapping refrigerant hole 546b (hereinafter, referred to as a fourth refrigerant flow path P4) which communicate with each other without overlapping the first balance weight 550 and the second balance weight 560 in the axial direction may communicate with the motor receiving space S1, so that the refrigerant in the motor receiving space S1 may also flow through the inside of the rotor 500 through the fourth refrigerant flow path P4.

Also, the first cover non-overlapping fastening hole 538e, the n number of core fastening holes 528, the second cover non-overlapping fastening hole 548e (hereinafter, referred to as a fifth refrigerant flow path P5) which communicate with each other without overlapping the first balance weight 550 and the second balance weight 560 in the axial direction may communicate with the motor receiving space S1, so that the refrigerant in the motor receiving space S1 may also flow through the inside of the rotor 500 through the fifth refrigerant flow path P5.

Accordingly, the rotor 500 is readily cooled, thereby suppressing the performance degradation of the motor 30 and the loss of operational capability by suppressing the temperature rise of the magnet 510 provided in the rotor 500 and the consequent demagnetization phenomenon.

Here, within the motor receiving space S1, the temperature of the refrigerant of the first space S11 side communicating with the intake port 14d may be lower than the temperature of the refrigerant of the second space S12 side communicating with the compression mechanism receiving space S2. Therefore, the number of first balance weight refrigerant holes 559 may be different from the number of second balance weight refrigerant holes 569. It may be preferable that the number of first balance weight refrigerant holes 559 is greater than the number of second balance weight refrigerant holes 569 such that the relatively low-temperature refrigerant of the first space S11 side is more readily supplied to the refrigerant flow path P, and thus, the magnet 510 is more readily cooled.

Also, the magnet 510 may also be cooled by the refrigerant of the motor receiving space S1 contacting the outer peripheral of the rotor 500. In order to allow the radially outer side of the magnet 510 to be cooled by the refrigerant of the motor receiving space S1 and the radially inner side of the magnet 510 to be cooled by the refrigerant flowing through the refrigerant flow path P, it may be preferable that the core refrigerant hole 526, the core fastening hole 528, the first cover refrigerant hole 536, the first cover fastening hole 538, the second cover refrigerant hole 546, the second cover fastening hole 548, the first balance weight refrigerant hole 559, the first balance weight fastening hole 558, the second balance weight refrigerant hole 569, and the second balance weight fastening hole 568 should be formed closer to the center than the magnet 510 in a direction of rotation radius of the rotor 500.

Also, the refrigerant holes (the core refrigerant hole 526, the first cover refrigerant hole 536, and the second cover refrigerant hole 546) have a greater influence on the cooling of the magnet 510 than the fastening holes (the core fastening hole 528, the first cover fastening hole 538, and the second cover fastening hole 548) that are partially blocked by the first fastening member 570 or the second fastening member 580 and allow the refrigerant to flow through only a portion thereof. Therefore, as described above, it may be preferable in terms of the increase in the heat exchange area that the sizes of the refrigerant holes should be larger than the sizes of the fastening holes and the refrigerant holes have a plurality of curved surfaces.

Meanwhile, in the embodiment, since the n number of core fastening holes 528, the n number of first cover fastening holes 538, and the n number of second cover fastening holes 548 are formed at an equal interval in the circumferential direction of the rotor 500, respectively, the first balance weight 550 and the second balance weight 560 may be installed at any position in the circumferential direction of the rotor 500, respectively. Accordingly, the first balance weight 550 and the second balance weight 560 may be easily installed, and the rotation balance of the rotor 500 may be easily adjusted.

Meanwhile, in the embodiment, the two first balance weight refrigerant hole 559 are formed, and the one second balance weight refrigerant hole 569 is formed. However, the embodiment is not limited thereto. That is, the number of first balance weight refrigerant holes 559 and the number of second balance weight refrigerant holes 569 may be adjusted appropriately.

Also, in the embodiment, the first balance weight refrigerant hole 559 communicates with the first cover overlapping refrigerant hole 536a. However, the embodiment is not limited thereto. That is, the first balance weight refrigerant hole 559 may communicate with the first cover overlapping fastening hole 538d, or may communicate with both the first cover overlapping refrigerant hole 536a and the first cover overlapping fastening hole 538d.

Also, in the embodiment, the second balance weight refrigerant hole 569 communicates with the second cover overlapping refrigerant hole 546a and the second cover overlapping fastening hole 548d. However, the embodiment is not limited thereto. That is, the second balance weight refrigerant hole 569 may communicate with either the second cover overlapping refrigerant hole 546a or the second cover overlapping fastening hole 548d of the second cover 540.

Meanwhile, in the embodiment, "n" is set to 8 and "m" is set to 2. However, the embodiment is not limited thereto. That is, "n" and "m" may be adjusted appropriately.

The invention claimed is:

1. An electric compressor comprising:
   a housing;
   a compression mechanism which compresses a refrigerant within the housing; and
   a motor which provides a driving force to the compression mechanism,
   wherein the motor comprises:
      a stator supported on the housing, and
      a rotor rotated by interaction with the stator,
      wherein the rotor comprises:
         a core in which a magnet is installed,
         a balance weight installed at an end of the core to adjust a rotation balance of the rotor,
         a cover that covers the core between the core and the balance weight, and
         a refrigerant flow path through which the refrigerant sequentially flows through the balance weight, the cover, and the core,
      wherein the core includes a plurality of core refrigerant holes which pass through the core respectively in an axial direction and are disposed to be spaced apart from each other in a circumferential direction of the core, wherein the cover includes a plurality of cover refrigerant holes which pass through the cover respectively in the axial direction and are disposed to be spaced apart from each other in a circumferential direction of the cover, wherein the plurality of core refrigerant holes communicates with the plurality of cover refrigerant holes, wherein at least a portion of the plurality of cover refrigerant holes communicates with a motor receiving space which receives the motor and the refrigerant, wherein the core includes a plurality of core bridges that are disposed one by one each between the plurality of core refrigerant holes, and a plurality of core fastening holes that pass through the plurality of core bridges in the axial direction respectively, wherein the cover includes a plurality of cover bridges that are disposed one by one each between the plurality of cover refrigerant holes, and a plurality of cover fastening holes that pass through the plurality of cover bridges in the axial direction respectively, wherein the plurality of core fastening holes communicates with the plurality of cover fastening holes, wherein a portion of the plurality of cover fastening holes communicates with the motor receiving space, wherein the balance weight includes a plurality of balance weight fastening holes which pass through the balance weight in the axial direction respectively and are disposed to be spaced apart from each other in a circumferential direction of the balance weight, wherein a number of the plurality of balance weight fastening holes is less than a number of the plurality of cover fastening holes, wherein the plurality of cover fastening holes of which the number is the same as the number of the plurality of balance weight fastening holes among the plurality of cover fastening holes communicate with the plurality of balance weight fastening holes, wherein the plurality of core fastening holes of which a number is the same as the number of the plurality of balance weight fastening holes among the plurality of core fastening holes communicate with the plurality of cover fastening holes of which the number is the same as the number of the plurality of balance weight fastening holes, wherein the core, the cover, and the balance weight are assembled by a plurality of fastening members which are inserted into the plurality of balance weight fastening holes, the plurality of core fastening holes of which the number is the same as the number of the plurality of balance weight fastening holes, and the plurality of cover fastening holes of which the number is the same as the number of the plurality of balance weight fastening holes, wherein remaining ones of the plurality of core fastening holes into which the plurality of fastening members is not inserted among the plurality of core fastening holes communicate with remaining ones of the plurality of cover fastening holes into which the plurality of fastening members is not inserted among the plurality of cover fastening holes, wherein at least a portion of the remaining ones of the plurality of cover fastening holes communicates with the motor receiving space, wherein the remaining ones of the plurality of cover fastening hole includes an overlapping fastening hole disposed at a position overlapping the balance weight in the axial direction, wherein the plurality of cover refrigerant holes includes an overlapping refrigerant hole disposed at a position overlapping the balance weight in the axial direction, and wherein the balance weight further includes a balance weight refrigerant hole which passes through the balance weight in the axial direction and communicates with at least one of the overlapping fastening hole and the overlapping refrigerant hole.

2. The electric compressor of claim 1, wherein the balance weight is formed smaller than the cover, so that a portion of the plurality of cover refrigerant holes and the plurality of cover fastening holes communicates with the motor receiving space.

3. The electric compressor of claim 1, wherein the plurality of core fastening holes and the plurality of the cover fastening holes are formed at an equal interval in a circumferential direction of the rotor.

4. The electric compressor of claim 1, wherein the motor receiving space includes a first space where one end of the rotor is disposed and the refrigerant is introduced from an outside of the housing, and a second space in which an other end of the rotor is disposed and which guides the refrigerant of the motor receiving space to the compression mechanism, wherein the balance weight includes a first balance weight disposed in the first space, and a second balance weight disposed in the second space, and wherein the first balance weight is formed in such a manner as not to overlap the second balance weight in the axial direction.

5. The electric compressor of claim 4, wherein a portion of the plurality of cover refrigerant holes is formed in such a manner as not to overlap the first balance weight and the second balance weight in the axial direction.

6. The electric compressor of claim 4, wherein a portion of the remaining ones of the plurality of cover fastening holes is formed in such a manner as not to overlap the first balance weight and the second balance weight in the axial direction.

7. The electric compressor of claim 4, wherein each of the first balance weight and the second balance weight include at least one balance weight refrigerant hole, and wherein a number of first balance weight refrigerant holes, that is, the at least one balance weight refrigerant hole of the first balance weight, is different from a number of second balance weight refrigerant holes, that is, the at least one balance weight refrigerant hole of the second balance weight.

8. The electric compressor of claim 7, wherein the number of first balance weight refrigerant holes is greater than the number of second balance weight refrigerant holes.

9. The electric compressor of claim 1, wherein the plurality of core refrigerant holes, the plurality of core fastening holes, the plurality of cover refrigerant holes, the plurality of balance weight fastening holes, and the balance weight refrigerant hole are formed closer to a center than the magnet in a direction of rotation radius of the rotor.

* * * * *